United States Patent
Sasaki et al.

(10) Patent No.: US 8,726,627 B2
(45) Date of Patent: May 20, 2014

(54) GAS TURBINE EQUIPMENT UTILIZING HIGH HUMIDITY

(75) Inventors: Kenji Sasaki, Hitachi (JP); Hidefumi Araki, Hitachi (JP); Yukinori Katagiri, Hitachinaka (JP); Moriaki Tsukamoto, Tokai (JP); Shinichi Hoizumi, Hitachi (JP)

(73) Assignee: Hitachi, Ltd., Tokyo (JP)

(*) Notice: Subject to any disclaimer, the term of this patent is extended or adjusted under 35 U.S.C. 154(b) by 1017 days.

(21) Appl. No.: 12/795,046

(22) Filed: Jun. 7, 2010

(65) Prior Publication Data
US 2010/0236255 A1 Sep. 23, 2010

Related U.S. Application Data

(62) Division of application No. 11/480,392, filed on Jul. 5, 2006, now Pat. No. 7,757,475.

(30) Foreign Application Priority Data

Jul. 6, 2005 (JP) .................................. 2005-197088

(51) Int. Cl.
*F02C 7/08* (2006.01)

(52) U.S. Cl.
USPC ............................................. 60/39.5

(58) Field of Classification Search
USPC ............ 60/39.5, 39.53, 39.54, 39.55, 39.511, 60/728
See application file for complete search history.

(56) References Cited

U.S. PATENT DOCUMENTS

| | | | |
|---|---|---|---|
| 4,448,018 A | 5/1984 | Sayama et al. | |
| 5,507,141 A | 4/1996 | Stigsson | |
| 6,223,523 B1 * | 5/2001 | Frutschi | 60/775 |
| 6,397,578 B2 | 6/2002 | Tsukamoto et al. | |
| 6,578,354 B2 | 6/2003 | Hatamiya et al. | |
| 6,644,013 B1 | 11/2003 | Hatamiya et al. | |
| 6,854,259 B2 | 2/2005 | Hatamiya et al. | |
| 6,877,320 B2 * | 4/2005 | Linder | 60/775 |
| 6,901,736 B2 | 6/2005 | Hatamiya et al. | |
| 6,973,772 B2 | 12/2005 | Hatamiya et al. | |
| 6,981,360 B2 | 1/2006 | Yagi et al. | |
| 2004/0112037 A1 | 6/2004 | Yagi et al. | |

(Continued)

FOREIGN PATENT DOCUMENTS

| | | |
|---|---|---|
| JP | 11257006 | 9/1999 |
| JP | 2000282894 | 10/2000 |

(Continued)

*Primary Examiner* — Phutthiwat Wongwian
(74) *Attorney, Agent, or Firm* — Mattingly & Malur, PC

(57) ABSTRACT

A gas turbine equipment utilizing high humidity, for preventing generation of white smoke throughout a year, and for restraining radiation of extra heat so as to restrain lowering of heat efficiency, the equipment comprising a humidifying device for humidifying compressed gas for combustion, a heat recovery device for recovering exhaust heat from a gas turbine or the compressed air so as to heat humidifying water in the humidifying device, a recuperator for recovering exhaust heat from the gas turbine and heating the compressed gas for combustion, a dehumidifying device for dehumidifying and recovering moisture in the exhaust gas having passed through the recuperator, and an exhaust gas reheater for heating the exhaust gas after dehumidification, and further comprising a temperature measuring device for measuring a temperature of the exhaust gas passing through the exhaust gas reheater, and a heating temperature adjusting device for increasing the heating temperature of the exhaust gas reheater if a temperature of the exhaust gas measured by the temperature measuring device is not higher than a predetermined value.

6 Claims, 5 Drawing Sheets

(56) References Cited

U.S. PATENT DOCUMENTS

2005/0011180 A1 1/2005 Hatamiya et al.
2007/0271900 A1 11/2007 Sasaki et al.
2008/0060345 A1 3/2008 Nakano et al.
2009/0038287 A1 2/2009 Sasaki et al.

FOREIGN PATENT DOCUMENTS

| | | |
|---|---|---|
| JP | 2001115855 | 4/2001 |
| JP | 2001214754 | 8/2001 |
| WO | 00/25009 | 5/2000 |

* cited by examiner

GAS TURBINE EQUIPMENT UTILIZING HIGH HUMIDITY

The present application is a divisional application of U.S. patent application Ser. No. 11/480,392, filed Jul. 5, 2006, now U.S. Pat. No. 7,757,475 B2, issued Jul. 20, 2010, and which claims priority to Japanese Patent Application No. 2005-197088, filed Jul. 6, 2005.

BACKGROUND OF THE INVENTION

1. Field of the Invention

The present invention relates to a gas turbine equipment utilizing high humidity, and in particular, to a gas turbine equipment utilizing high humidity comprising an exhaust gas repeater on the combustion gas exhaust side for preventing generation of white smoke.

2. Description of the Related Art

In general, in a gas turbine equipment utilizing high humidity, should exhaust gas be directly discharged into the atmosphere from a smokestack or the like, since a moisture falls in a saturated condition at a temperature of about 40 degrees C., the moisture in the exhaust gas would be condensed resulting in generation of white smoke. In order to prevent generation of such white gas, the exhaust gas is heated just before discharging it into the atmosphere, as disclosed in Patent Document 1, JP-A-2000-282894.

The technology disclosed in Patent Document 1 is effective when the gas turbine equipment is operated in a steady state or in a stable ambient air temperature condition, but since a heat quantity sufficient for preventing generation of white smoke cannot be applied to the exhaust gas upon a start of the gas turbine equipment or during the winter season, the generation of white smoke cannot be sufficiently prevented. Meanwhile, should the heating temperature of the exhaust gas be set to a higher temperature in view of the start of the gas turbine equipment or operation during the winter season, excessive heat would be applied to the exhaust gas during the summer season, resulting in radiation of extra heat. As a result, thermal efficiency would be lowered.

BRIEF SUMMARY OF THE INVENTION

A first object of the present invention is to provide a gas turbine equipment utilizing high humidity, which is capable of preventing generation of white smoke throughout a year.

A second object of the present invention is to provide a gas turbine equipment utilizing high humidity which can prevent generation of white smoke throughout a year, and as well can restrain radiation of extra heat so as to prevent lowering of thermal efficiency.

To the ends, according to the present invention, there is provided a gas turbine equipment utilizing high humidity, comprising a humidifier for humidifying compressed air for combustion, a heat recovery device for recovering exhaust heat from a gas turbine or the compressed air so as to raise a temperature of humidifying water in the humidifier, a heat recovery device for recovering exhaust heat from the gas turbine so as to raise a temperature of the compressed air for combustion, which has been humidified by the humidifier, a dehumidifier for removing and recovering moisture from the exhaust gas having passed through the heat recovery device, and an exhaust gas reheater for heating the exhaust gas after dehumidification, characterized by further comprising a temperature measuring means for measuring a temperature of the exhaust gas passing through the exhaust gas reheater, and a heating temperature adjusting means for raising the heating temperature of the exhaust gas reheater if a temperature of the exhaust gas measured by the temperature measuring means is not higher than a predetermined value.

With the configuration as stated above, since the heating temperature of the exhaust gas reheater may be controlled in accordance with a variation in exhaust gas temperature throughout a day and a year, the exhaust gas temperature can be controlled according to the ambient air temperature change, and as a result, generation of white gas may be prevented throughout a year, and further, radiation of extra heat may be restrained, thereby it is possible to prevent lowering of the thermal efficiency of the gas turbine equipment utilizing high humidity.

As stated above, according to the present invention, there may be provided a gas turbine equipment utilizing high humidity, which can prevent generation of white smoke throughout a year, and which can restrain radiation of extra heat so as to prevent lowering of the thermal efficiency thereof.

Other objects, features and advantages of the invention will become apparent from the following description of the embodiments of the invention taken in conjunction with the accompanying drawings.

BRIEF DESCRIPTION OF SEVERAL VIEWS OF DRAWING

DETAILED DESCRIPTION OF THE INVENTION

Figure 1:
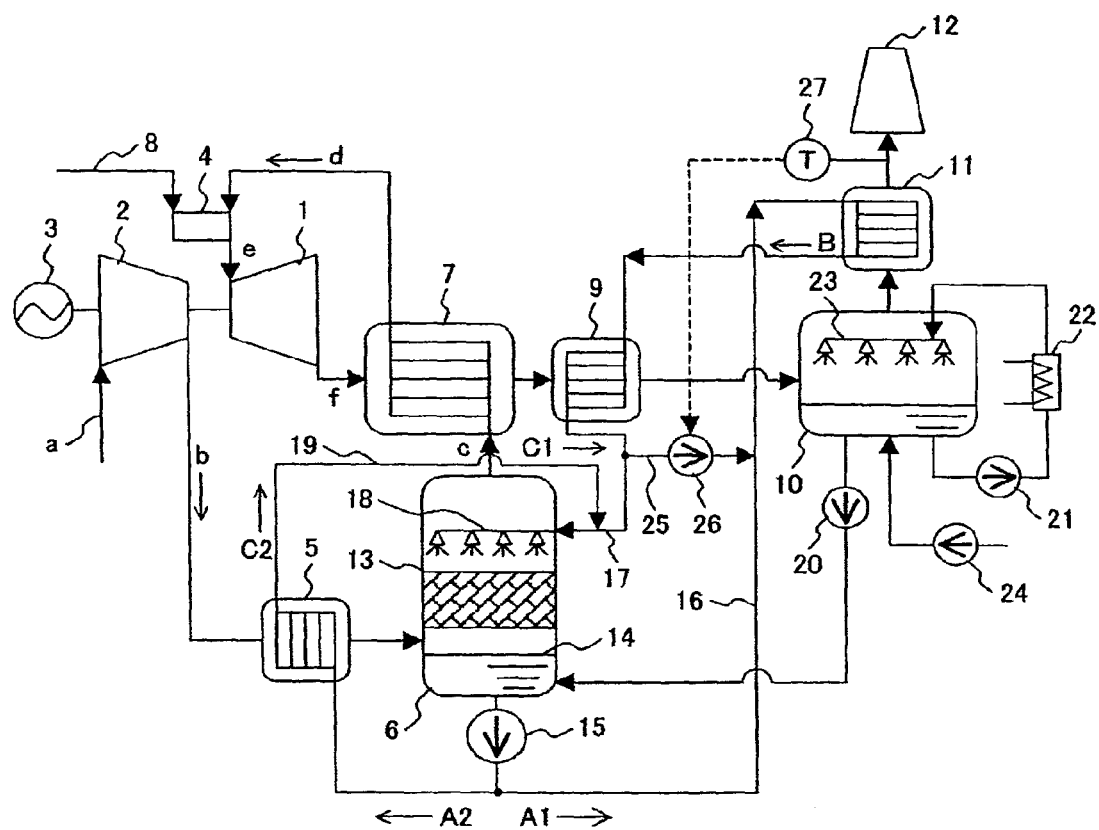
FIG. 1 is a block diagram illustrating a gas turbine power plant equipment utilizing high humidity, which is an embodiment of a gas turbine equipment utilizing high humidity according to the present invention.

Explanation will be hereinbelow made of a gas turbine power plant equipment utilizing high humidity, which is an embodiment of a gas turbine equipment utilizing high humidity, according to the present invention, with reference to FIG. 1.

The gas turbine power plant equipment utilizing high humidity according to this embodiment of the present invention comprises a gas turbine 1, an air compressor 2 and a generator 3 coaxial with the former, and a combustor 4. Air a sucked into the air compressor 2 is compressed so as to be turned into a compressed air b having a high temperature, then is discharged, and is cooled in the air cooler 5 before it is introduced into a humidifying tower 6, which is a humidifier. Air c humidified in the humidifying tower 6 is led through a recuperator 7 to be heated, and accordingly, it is turned into a compressed air d for combustion which is jetted into the combustor. The combustor 4 is connected thereto with a fuel supply pipe 8 for feeding fuel, and accordingly, the fuel fed through this fuel supply pipe 8 is mixed with the compressed air d for combustion and is burnt.

Combustion gas e burnt in the combustor 4 is fed into the gas turbine 1 which is therefore driven so as to rotate the air compressor 2 and the power generator 3. Exhaust gas f having passed through the gas turbine 1 is led through the recuperator 7 so as to carry out heat-exchange in order to heat the humidified air c, and is emitted into the atmosphere from a smokestack 12, after passing through an economizer 9 constituting a heat recovery unit, a water recovery unit 10 constituting a dehumidifier for recovering moisture contained in the exhaust gas f, and an exhaust gas reheater 11 for heating the exhaust gas after recovery of moisture.

The humidifying tower 6 has therein a packing 13 for retaining water and for allowing air to pass therethrough, and reserves, in its bottom part, humidifying water 14. A part A1 of the humidifying water 14 in the bottom part of the humidifying tower 6 is led through a pipe line 16 and is fed so as to heat the exhaust gas after moisture recovery in the exhaust gas reheater 11 by means of a humidifying tower circulation pump 15. Water B having passed through the exhaust gas repeater 11 so as to lower its temperature is heated by the exhaust gas f in the economizer 9, and the heated water C1 is sprayed by a sprayer 18 provided in the upper part of the inside of the humidifying tower 6 after passing through a pipe line 17. A water liquid film formed over the outer surface of the packing 13 by displaying of the heated water C1, is made into direct contact with the compressed air b which has be led into the tower 6 by way of the air cooler 5, and accordingly, the heated water is evaporated so as to humidify the compressed air b.

Meanwhile, the other part A2 of the humidifying water 14 fed out by the humidifying tower circulation pump 15 cools in the air cooler 5 the compressed air b which has been compressed and heated up so as to absorb heat. The heated water C2 is then led through a pipe line 19 and to the sprayer 18 side of the pipe line 17, and is sprayed into the humidifying tower 6 from the sprayer 18.

It is noted that the above-mentioned water recovery unit 10 is adapted to replenish the humidifying tower 6 with the humidifying water 14 by means of a recovery water feed pump 20. Further, the exhaust gas discharged from the economizer 9 has a high humidity of about 20% by weight, and accordingly, should such exhaust gas be directly emitted from the smokestack 12, it would be condensed within the smokestack 12 or would generate white smoke. Thus, in order to prevent these problems, the water recovery unit 10 recovers moisture in the exhaust gas by spraying the water from a top thereof, by way of a recovery water circulation pump 21, a recovery water cooler 22 and a sprayer 23. Further, the water which has been lost during the recovery is replenished with a make-up water pump 24.

By the way, the exhaust gas having passed through the water recovery unit 10 falls in a saturated condition at a temperature of 40 degrees C., and accordingly, it is heated in the exhaust gas reheater 11 by the part A1 of the heated humidifying water 14 from the bottom part of the humidifying tower 6 so as to prevent generation of white smoke.

Further, in the configuration of this embodiment, a recirculation pipe line 25 is provided to connect the pipe line 17 on the outlet side of the economizer 9 and the pipe line 16 to the exhaust gas regenerator 11, and a recirculation pump 26 for feeding the heated water C1 to the exhaust regenerator 11 is provided on the recirculation pipe line 25. Further, the revolution speed of the recirculation pump 26 is controlled by arithmetic processing means which is not shown, in accordance with a measured temperature from a temperature measuring means 27 for measuring a temperature of the exhaust gas on the outlet side of the exhaust reheater 11.

Next, explanation will be made of the operation of the above-mentioned configuration.

Figure 2A:
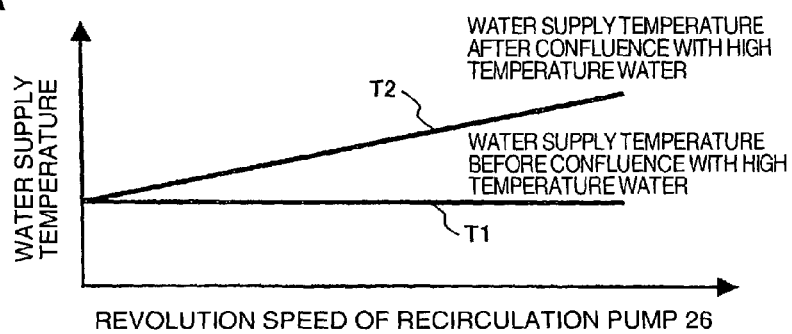
FIGS. 2A to 2C are charts which show a supply water temperature, a water spray temperature and a quantity of flow, a generation power and a power generation efficiency with respect to a revolution speed of a recirculation pump.

Upon a start of the gas turbine power plant equipment utilizing high humidity, the temperature of exhaust gas emitted from the smokestack 12 is, of course, lower, and accordingly, the recirculation pump 26 is rested in this condition. However, a temperature of the exhaust gas is measured by the temperature measuring means 27, and the measured result is processed by the arithmetic processing means (which is not shown). If it is determined that the temperature of the exhaust gas causes generation of white smoke, it is instructed to drive the recirculation pump 26 at a designated revolution speed. When the recirculation pump 26 is driven by the instruction from the arithmetic processing means, as shown in FIG. 2A, in comparison with a temperature T1 of supply water before confluence with a high temperature water by the part A1 of the humidifying water 14 fed into the exhaust gas reheater 11, a temperature T2 of supply water after the confluence with high temperature water, which is flown with the heated water C1 from the economizer 9 through the recirculation pipe line 25 is raised as the revolution speed of the recirculation pump 26 increases. As a result, the heat value applied to the exhaust gas may be increased, thereby it is possible to prevent generation of white smoke.

Figure 2B:
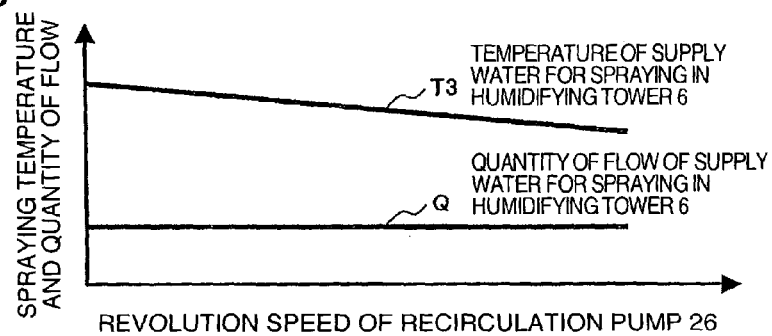
Figure 2C:
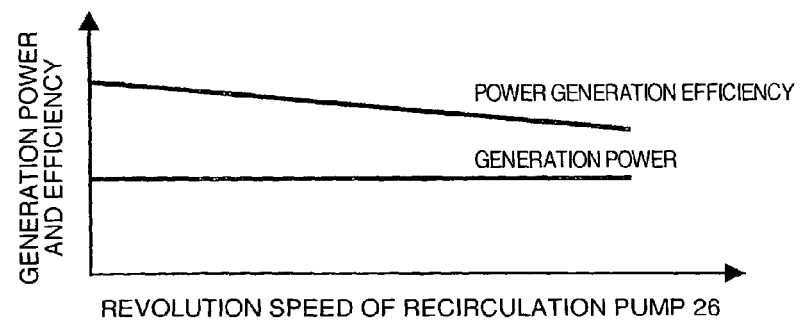

By the way, since high temperature water is recirculated in the exhaust gas reheater 11 so that the heat value applied to the exhaust gas is correspondingly increased, as shown in FIG. 2B, if the quantity Q of water sprayed into the humidifying tower 6 is set to be constant, the temperature T3 of sprayed water is lowered. When the temperature T3 of the sprayed water decreases, a value of the humidity humidifying the compressed gas b in the humidifying tower 6 is decreased, and, as a result, as shown in FIG. 2C, if the generation output power is maintained to be constant, the supply quantity of the fuel for driving the gas turbine is increased, and accordingly, the power generation efficiency (thermal efficiency) of the generator 3 is lowered.

Accordingly, in order to prevent lowering of the power generation efficiency, the arithmetic processing means finely controls the revolution speed of the recirculation pump 26 so as to adjust the quantity of flow of the heated water C1 fed from the recirculation pipe line 25 to the exhaust gas reheater 11, thereby, preventing extra heat which exceeds a value required for preventing generation of white smoke from being applied to the exhaust gas. For example, in an exhaust gas emitting condition in which no white smoke is generated, the operation of the recirculation pump 26 is stopped so as to interrupt the supply of the heated water C1 into the exhaust gas reheater 11 in order to prevent radiation of extra heat, thereby it is possible to restrain the power generation efficiency from being lowered.

Figure 3:
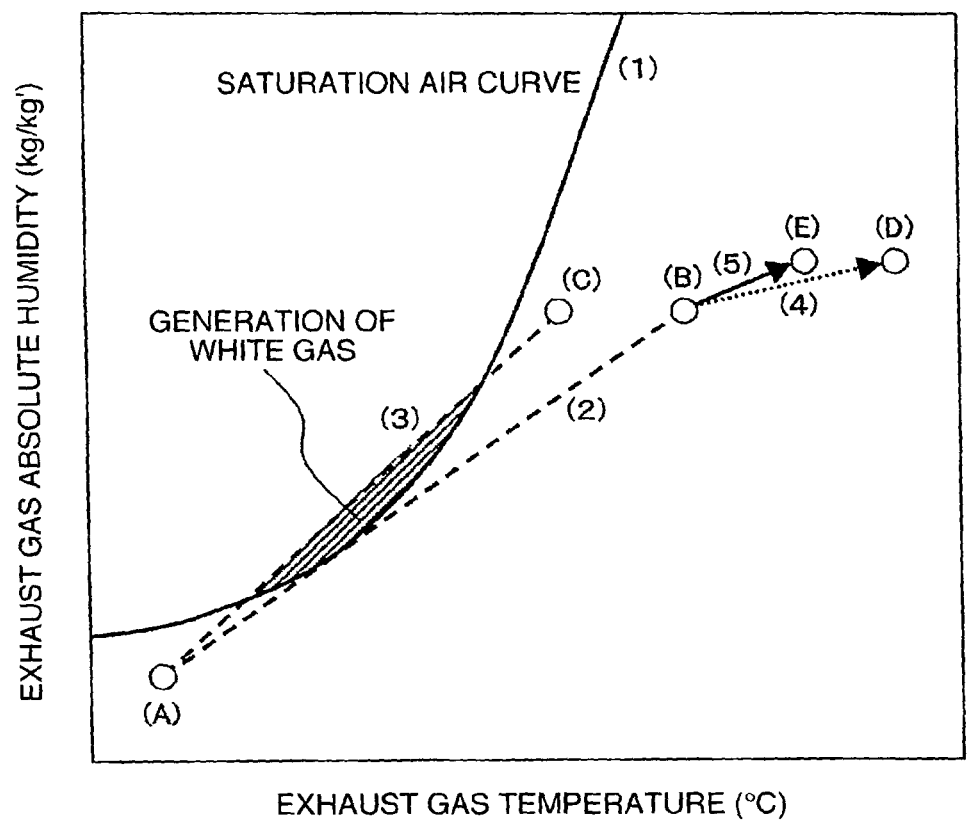
FIG. 3 is a chart which shows a relationship between generation of white smoke and avoidance of generation thereof.

Next, explanation will be made of prevention of generation of white smoke under control of the revolution speed of the recirculation pump 26 along the progress from a start to a rated load operation of the gas turbine power plant equipment utilizing high humidity, as shown in FIG. 3.

FIG. 3 shows the relationship between the temperature of the exhaust gas at the outlet of the smokestack 12 and the absolute humidity under the atmospheric temperature-absolute humidity condition (A), (B) indicates an exhaust gas condition in the case of driving the recirculation pump 26 during a start of the gas turbine power plant equipment utilizing high humidity, and (C) indicates an exhaust gas condition in the case of no use of the recirculation pump 26 during a start of the gas turbine power plant equipment utilizing high humidity. Further, (D) indicates an exhaust gas condition in the case of using the recirculation pump 26 during rated load operation, and (E) indicates an exhaust gas condition in the case of no use of the recirculation pump 26 during rated load operation.

During the start of the gas turbine power plant equipment utilizing high humidity, if no circulation pump 26 is used, the exhaust gas is emitted under the exhaust gas condition (C), and accordingly, the exhaust gas is mixed with the atmospheric air therearound so that both temperature and humidity are lowered along a broken line (3) in the drawing, and the atmospheric condition (A) is finally restored. When the atmospheric condition is being restored, an air saturation humidity curve (1) is crossed, and accordingly, an oversaturated condition is caused, resulting in generation of white smoke.

However, when the high temperature water from the economizer 9 is fed into the exhaust gas reheater 11 by driving the recirculation pump 26 so as to increase the temperature of the exhaust gas up to (B), the temperature and the humidity of the exhaust gas are lowered along the broken line (2) so as to restore the atmospheric condition (A). At this time, the air saturation humidity curve (1) is not crossed, and accordingly, no generation of white smoke is caused.

It is noted that since (B) has a lower limit temperature at which no generation of white smoke is caused during a start, though the temperature of the exhaust gas may be increased up to a value not less than (B), should the temperature of the exhaust gas be merely increased up to the value not less than (B), extra heat is applied to the exhaust gas, and corresponding radiation of the extra heat would be caused so as to lower the power generation efficiency. Thus, in the exhaust gas reheating, it is desired to heat the exhaust gas up to (B) at which no generation of white smoke is caused.

In the case of driving the recirculation pump 26 at a constant revolution speed during increase of load from a start of the gas turbine power plant equipment utilizing high humidity, the exhaust gas varies its emitting condition from (B) along the dotted line (4) in the drawing, and during rated load operation, it is emitted in the condition (D). Meanwhile, since the temperature of the exhaust gas also increases as the load is increased, it is such a condition that no generation of white smoke is caused even in the exhaust gas condition (E) in which no recirculation pump 26 is driven. In this condition in which an excessive heat value is applied to the exhaust gas so as to lower the power generation efficiency, it is satisfactory to take such a manner that the revolution speed of the recirculation pump 26 is lowered under control so as to change the exhaust gas condition from (B) to (E) along the line (5) in the drawing, and when the rated load is obtained, the operation of the recirculation pump 26 is stopped. By controlling the recirculation pump 26 in the above-mentioned manner, the temperature of the supply water for reheating (the temperature of the exhaust gas) can restrain the generation of white smoke during operation at a low temperature, and the temperature of the supply water for reheating (the temperature of the exhaust gas) can prevent radiation of an extra heat during operation at a high temperature, thereby it is possible to restrain the power generation efficiency from lowering.

By the way, although the temperature of the exhaust gas emitted from the smokestack 12 in the above-mentioned embodiment is measured by the temperature measuring means 27 so as to control the recirculation pump 26, there may be taken such a manner that the temperature of the high temperature water fed into the exhaust gas reheater 11 is measured in order to control the recirculation pump 26. Further, with the provision of an exhaust gas temperature measuring means for measuring a temperature of the exhaust gas passing through the exhaust gas reheater 11, an ambient air temperature measuring means for measuring an ambient air temperature, and a temperature difference comparing means such as arithmetic processing means for comparing a temperature difference between temperatures measured by the ambient air temperature measuring means and the exhaust temperature measuring means, there may be taken such a manner that the recirculation pump 26 is controlled when a temperature difference not less than a predetermined value is detected by the temperature difference comparing means.

Figure 1A:
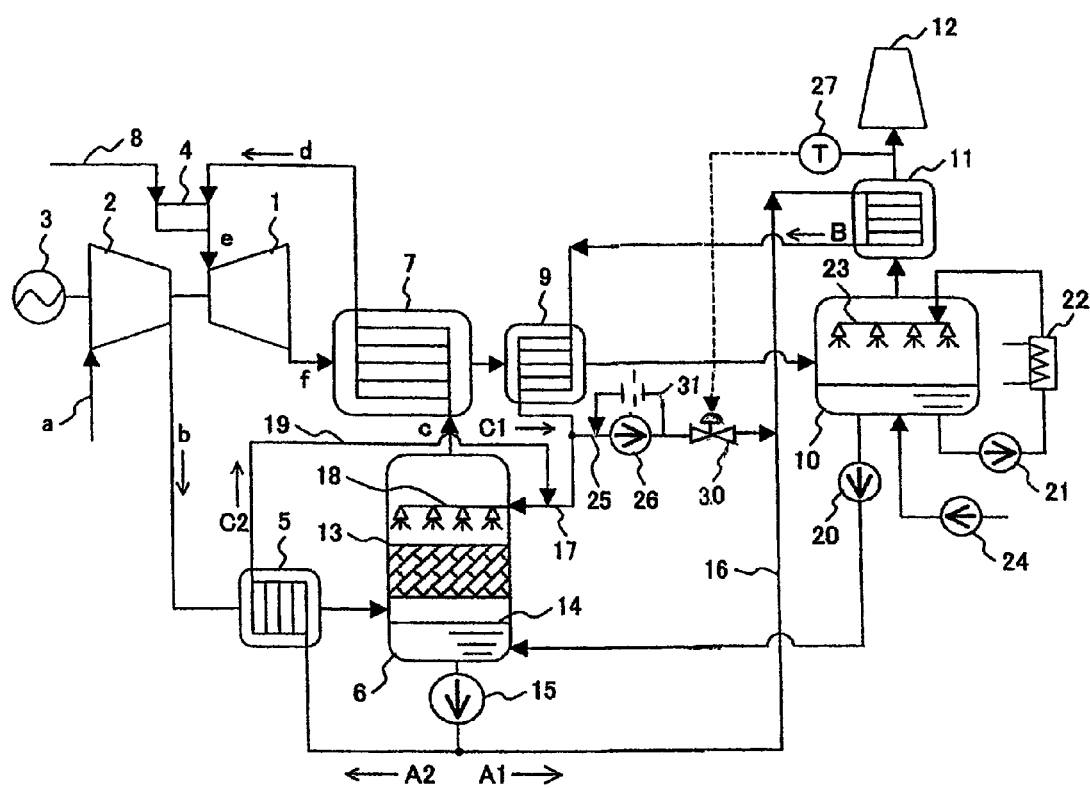
FIG. 1A is a block diagram illustrating a modified embodiment of the gas turbine power plant depicted in FIG. 1.

In addition, as depicted in FIG. 1A, instead of controlling the revolution speed of the recirculation pump 26, with the provision of a recirculation flow quantity adjusting valve 30 whose opening angle is controlled being based upon a result of measurement by the temperature measuring means 27 on the outlet side of the recirculation pump 26, there may be taken such a manner that an overflow pipe line 31 is connected at one end thereof between the recirculation flow quantity adjusting valve 30 and the recirculation pump 26 and at the other end to the downstream side of the pipe line 25 in order to adjust the quantity of flow.

With the use of this flow quantity adjusting mechanism depicted in FIG. 1A, it is possible to adjust the supply of the high temperature water into the exhaust gas reheater 11 through the adjustment of the opening angle of the recirculation flow quantity adjusting valve 30, and the high temperature water which is not necessary for the supply into the exhaust gas reheater 11 is led through the overflow pipe line 31 to the pipe line 25 and into pipe line 17 and is sprayed in the humidifying tower 6. As a result, no revolution speed control is required for the recirculation pump 26, and accordingly, an inexpensive pump may be used.

Further, in the configuration of the above-mentioned embodiment, if the compressed air b in the humidifying tower 6 is fully humidified only by the supply of the heated water C1 from the economizer 9, the air cooler 5 may be eliminated.

Although explanation has been made of such a process, as stated above, that the generation of white smoke and the lowering of the power generation efficiency which are caused during the period from a start to rated load operation of the gas turbine power plant equipment utilizing high humidity, are restrained, the same process is taken together with the same equipment even in such a case that the atmospheric temperature is low in the winter season, and accordingly, the same technical effects and advantage may be obtained. As a result, it is possible to prevent generation of white smoke throughout a day and a year, and radiation of extra heat may be restrained, thereby it is possible to restrain the power generation efficiency from lowering.

Figure 4:
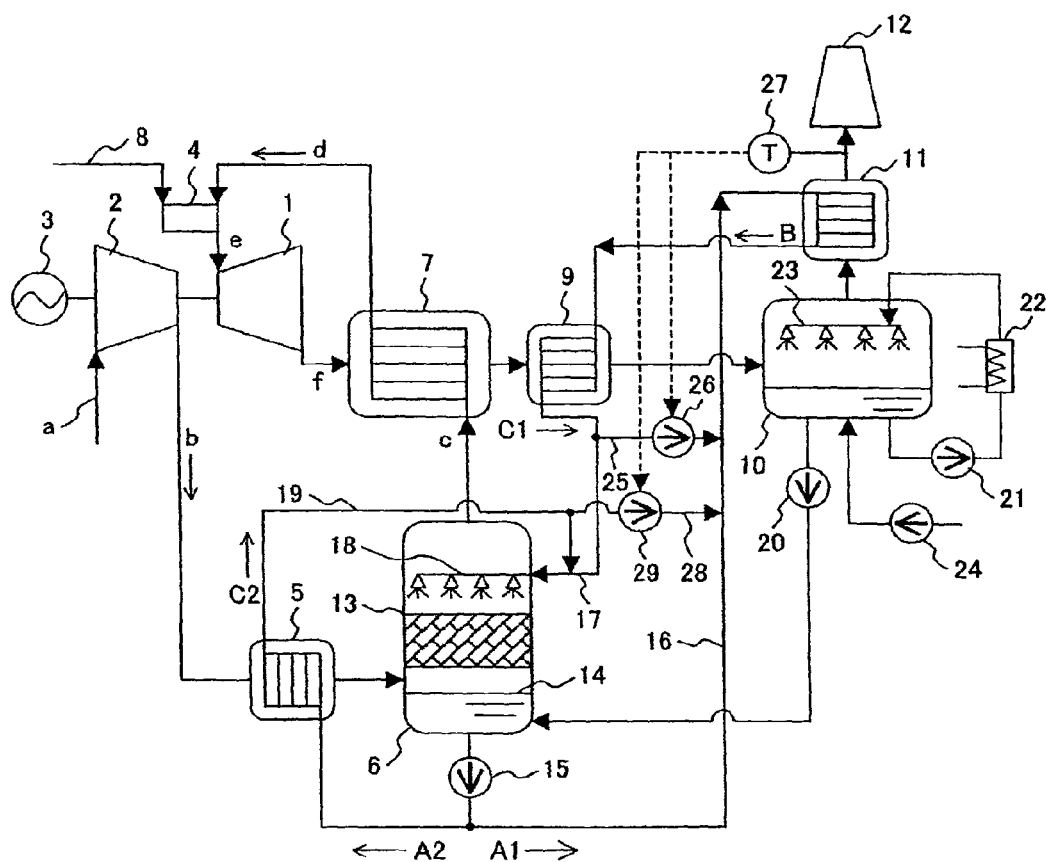
FIG. 4 is a block diagram illustrating a gas turbine power plant equipment utilizing high humidity, which is another embodiment of the gas turbine equipment utilizing high humidity, according to the present invention.

FIG. 4 is a view illustrating a gas turbine power plant equipment utilizing high humidity in another embodiment of the gas turbine equipment utilizing high humidity according to the present invention. Like reference numerals are used to denote like parts to those shown in FIG. 1 in order to prevent duplicated explanation thereof.

The configuration of this embodiment is the same as that of the embodiment shown in FIG. 1, except that the pipe line 19 returned to the humidifying tower 6 is connected to the pipe line 16 connected to the exhaust gas reheater 11 through the intermediary of a recirculation pipe line 28 which is provided thereto with a recirculation pump 29 whose revolution speed is controlled in accordance with a temperature measured by the temperature measuring means 27, and a part of the heated water C2 which has been heated in the air cooler 5 is fed to the pipe line 16 under the control of the temperature measuring means 27.

With the configuration of this embodiment, if the temperature of the supply water fed to the exhaust gas reheater 11 from the pipe line 16 is low and the temperature of the exhaust gas led to the smokestack 12 is low, according to the temperature measured by the temperature measured means 27, the recirculation pumps 26, 29 are driven under control of the revolution speeds thereof. Through the control of the revolution speeds of these recirculation pumps 26, 29, the quantity of the high temperature water fed into the exhaust gas reheater 11 is increased so as to increase the heat value applied to the exhaust gas in order to restrain generation of white gas.

Further, under such a condition that no generation of white gas is caused, the recirculation pumps 25, 29 are rested so as to stop the supply of the heated water C1 from the economizer 9 and the heated water C2 from the air cooler 5 into the exhaust gas reheater 11, and thus, the radiation of extra heat into the atmosphere is restrained, thereby it is possible to prevent lowering of the power generation efficiency.

It is noted that the air cooler 5 in the configuration of the embodiment shown in FIG. 4 is also one of the heat recovery devices according to the present invention, and accordingly, in the case that it is sufficient to humidify the compressed air b in the humidifying tower 6 and to heat the exhaust gas reheater 11 by the heated water C2 passing through the air cooler 5, there may also be taken such a configuration that the economizer 9, the pipe line 17, the recirculation pipe line 25, and the recirculation pump 26 are eliminated while water B whose temperature is lowered in the exhaust gas reheater 11 is sprayed in the humidifying tower 6.

By the way, in the configurations of the embodiments as stated above, the heating temperature adjusting means and the heated water temperature adjusting means for increasing the heating temperature of the exhaust gas reheater according to the present invention correspond to the arithmetic processing means which is not shown, the recirculation pumps 26, 29 and the recirculation flow quantity adjusting valve which are controlled by the arithmetic processing means, and as well, corresponds to the air cooler 5 and the economizer 9 which serves as a heat source. It is noted that the recuperator 7 may be also used as the heat source. Further, the flow quantity adjusting valve serving as the flow quantity adjusting means according to the present invention is the recirculation flow quantity adjusting valve.

Although explanation has been made of the configurations of the above embodiments in which the gas turbine power plant equipment utilizing high humidity coupled thereto with the generator as a load, it goes without saying that the gas turbine power plant equipment utilizing high humidity may drive any load other than the generator.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A gas turbine equipment utilizing high humidity, comprising a humidifying means for humidifying compressed gas for combustion, a heat recovery means including at least one of an economizer for recovering exhaust heat from a gas turbine and an air cooler for recovering heat from said compressed air to heat humidifying water in said humidifying means, a recuperator for recovering exhaust heat from the gas turbine and for heating the compressed gas for combustion, which compressed gas has been humidified by said humidifying means, a dehumidifying means for dehumidifying and recovering moisture in the exhaust gas having passed through said recuperator, and an exhaust gas reheater for heating the exhaust gas after dehumidification, wherein said gas turbine equipment further comprises a recirculation pipe line for recirculating heated water between said heat recovery means and said exhaust gas reheater, a temperature measuring means for measuring a temperature of the exhaust gas passing through said exhaust gas reheater, and a recirculation pump provided in said recirculation pipe line, and adapted to be driven when a temperature measured by said temperature measuring means is not higher than a predetermined value.

2. The gas turbine equipment utilizing high humidity as set forth in claim 1, wherein said recirculation pipe line is provided with a flow quantity adjusting means for adjusting a quantity of flow of the heated water flowing therethrough.

3. The gas turbine equipment utilizing high humidity as set forth in claim 2, wherein said flow quantity adjusting means is a means for controlling a revolution speed of said recirculation pump.

4. The gas turbine equipment utilizing high humidity as set forth in claim 2, wherein said flow quantity adjusting means comprises a flow quantity adjusting valve provided on a discharge side of said recirculation pump and an overflow pipe connected between said flow quantity adjusting valve and said recirculation pump.

5. The gas turbine equipment utilizing high humidity as set forth in claim 4, wherein said heat recovery means includes said air cooler provided upstream of said humidifying means, said economizer provided downstream of said recuperator, and further includes said recirculation pipe line for recirculating heated water and being connected between said economizer and said exhaust gas reheater.

6. A gas turbine equipment utilizing high humidity, comprising a humidifying means for humidifying compressed gas for combustion, a heat recovery means including at least one of an economizer for recovering exhaust heat from a gas turbine and an air cooler for recovering heat from said compressed air to heat humidifying water in said humidifying means, a recuperator for recovering exhaust heat from the gas turbine and for heating the compressed gas for combustion, which compressed gas has been humidified by said humidifying means, a dehumidifying means for dehumidifying and recovering moisture in the exhaust gas having passed through said recuperator, and an exhaust gas reheater for heating the exhaust gas after dehumidification, wherein said gas turbine equipment further comprises a heated water temperature measuring means for measuring a temperature of the heated water passing through said exhaust gas reheater, and a heated water temperature adjusting means for increasing a temperature of heated water in said exhaust gas reheater if the temperature of the heated water measured by said temperature measuring means is not higher than a predetermined value.

* * * * *